March 29, 1949. S. Y. TAYLOR 2,465,496
BALE PRESS

Filed March 6, 1943 5 Sheets-Sheet 3

INVENTOR.
SAM Y TAYLOR DEC'D.
BY INA C. TAYLOR, EXEC.
Lester B Clark ATTORNEY.

March 29, 1949.  S. Y. TAYLOR  2,465,496
BALE PRESS

Filed March 6, 1943  5 Sheets-Sheet 4

INVENTOR.
SAM Y. TAYLOR DEC'D
INA C. TAYLOR EXEC.
BY Lester B Clark
ATTORNEY.

March 29, 1949.　　　S. Y. TAYLOR　　　2,465,496
BALE PRESS
Filed March 6, 1943　　　　　　　　　5 Sheets-Sheet 5
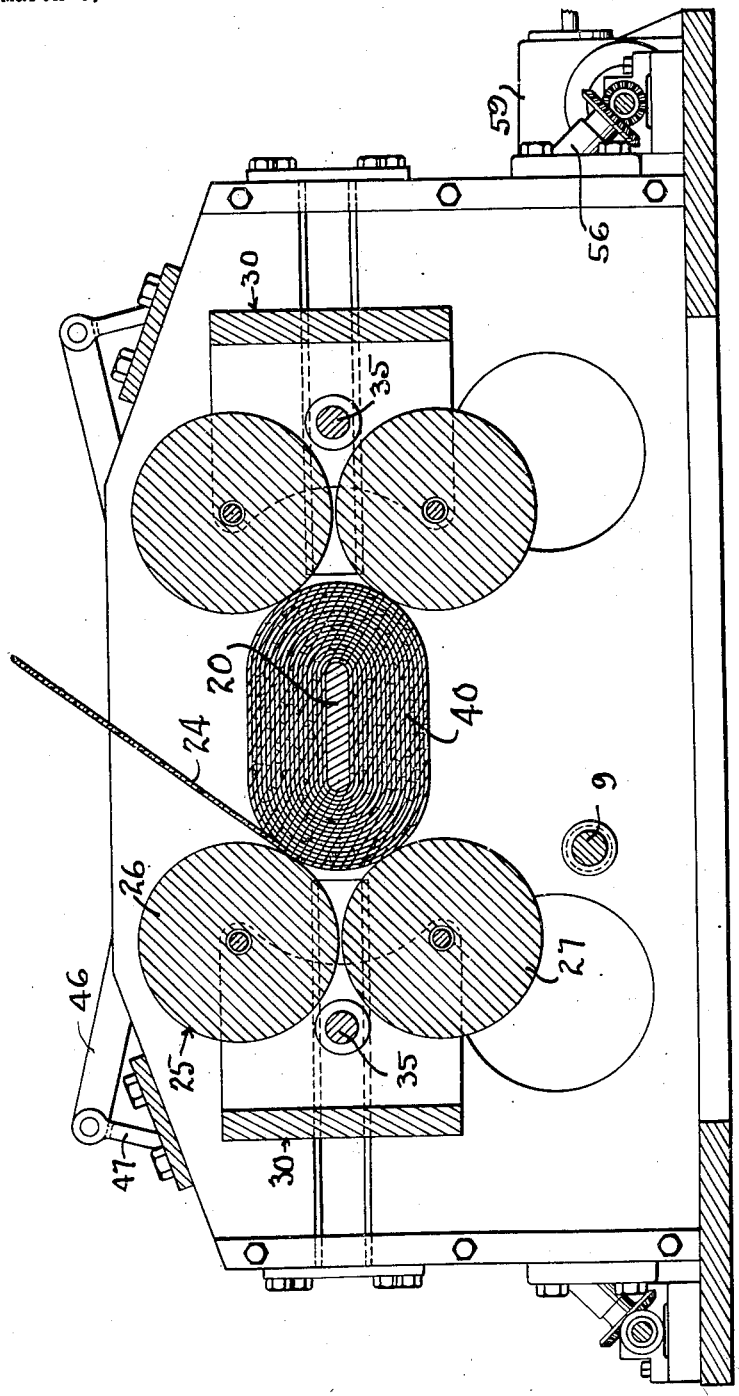
INVENTOR.
SAM Y. TAYLOR DEC'D
BY INA C. TAYLOR EXEC.
Lester B. Clark ATTORNEY Patented Mar. 29, 1949

2,465,496

UNITED STATES PATENT OFFICE 2,465,496

BALE PRESS

Sam Y. Taylor, deceased, late of Houston, Tex., by Ina C. Taylor, executrix, Houston, Tex., assignor, by direct and mesne assignments, of thirty per cent to F. J. Herbelin, Galveston, and thirty per cent to William F. Neale, Dallas, Tex.

Application March 6, 1943, Serial No. 478,206

5 Claims. (Cl. 100—1)

This invention relates to a baling press for cotton or other fibrous material and is particularly adapted for forming high density bales of a continuous bat of fibrous material.

The present application is a continuation in part and relates to the general type of subject-matter disclosed in the prior patent to Sam Y. Taylor, No. 2,313,102 dated March 9, 1943, for a high density press. It is intended that the present application obtain the benefit of the filing date of the application resulting in the above noted patent as to all common subject-matter.

Generally the press of the above patent effected compression of the bat of material due to the application of the force of gravity, whereas the present disclosure is directed to the mechanical application of a positive pressure or force to control the density of the bale.

It is one of the objects of the present invention to provide what is generally known as a round bale even though the present bale will have an elliptical shape wherein the bat of fibrous material is fed continuously on to the core so as to form a bale which is a continuous winding of the bat of fibrous material.

The advantages of a round type of bale in so far as shipment, storage or removal of the material from the bale is concerned are well known and it is not believed to be necessary to repeat them in this disclosure.

Another object of the invention is to provide a positive mechanical feed for applying pressure to the bat of material as it is fed onto the bale being formed.

Another object of the invention is to provide a system of levers and cams which will apply a constant presure to the bale being formed, but which will accommodate themselves to the increasing size of the bale.

Another object of the invention is to provide a series of gears, spindles and levers to apply a pressure to a bale being formed as the size of the bale increases.

Another object of the invention is to provide pressure rollers for an elliptical bale forming machine wherein the pressure rollers are equalized as the pressure is applied to the bale being formed, and are gradually retracted in accordance with a predetermined rate of movement, depending upon the thickness of the bat of material being fed to the press.

Another object of the invention is to provide a leverage mechanism for applying pressure to elliptical bales of fibrous material being formed so as to accommodate the size of the bale and to provide for a uniform density thereof.

Other and further objects of the invention will be readily apparent when the following description is considered in connection with the accompanying drawings wherein Fig. 1 is a top plan view, partly in section, of the baling press and showing the various mechanisms for controlling the density of the bale.

Fig. 5 is similar to Fig. 4 but illustrating the position of the parts after a considerable portion of the bale has been formed.

Figure 3:
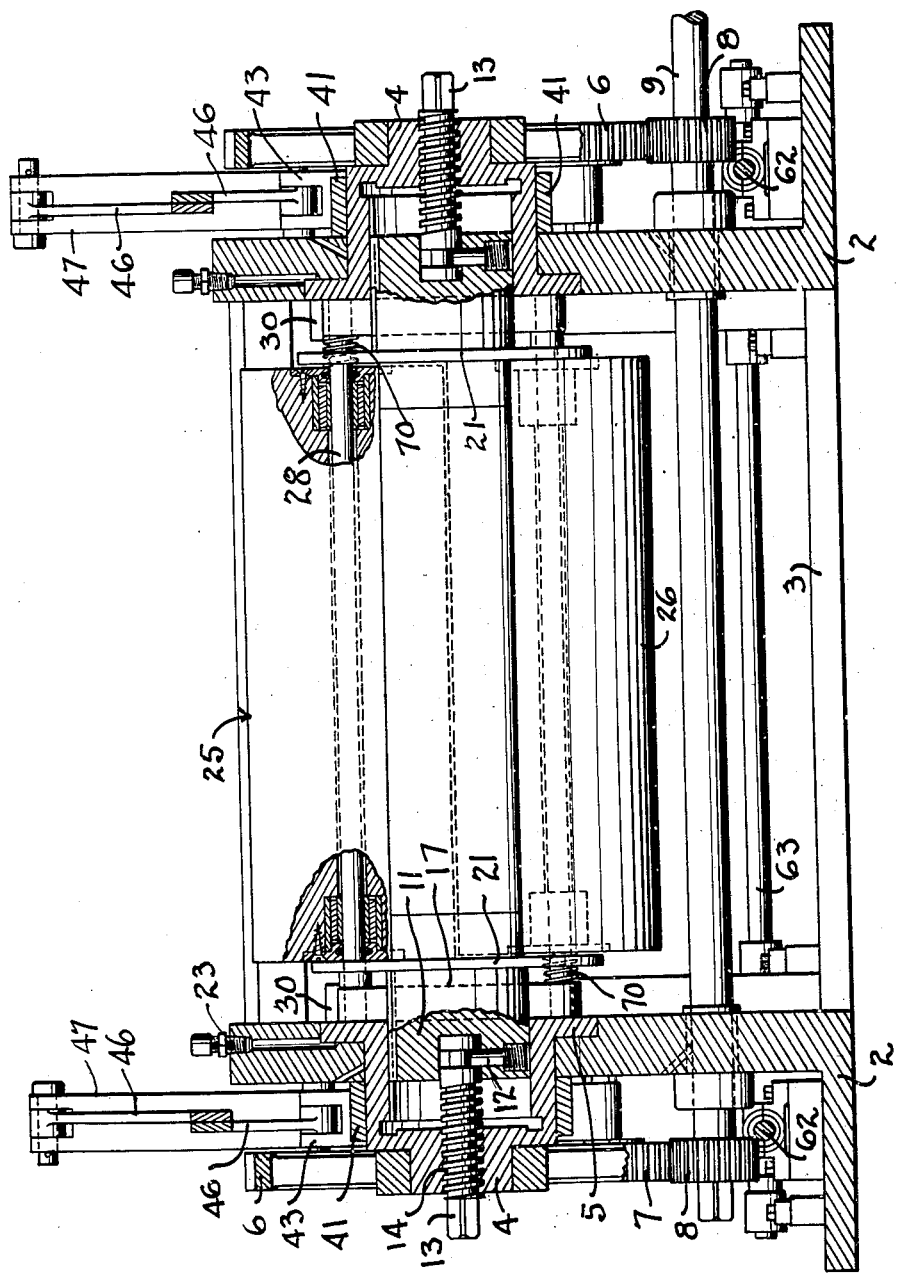
Fig. 3 is a vertical section through the press illustrating the heads and adjustments for positioning and maintaining the core and supporting the pressure rollers.

Fig. 3 shows a section of the press as having been made up of the side pieces 2 which are connected together by the cross piece 3 so as to form a solid and rigid frame to support the various parts of the mechanism. A hub 4 is shown as being rotatably mounted in each of the side pieces 2 and has a flange 5 thereon to prevent lateral outward movement of the hub relative to the side pieces. The drive gear 6 having teeth 7 thereon to mesh with the pinion 8 has been provided. In this manner power is imparted to the press to drive the core in forming the bale. The power to the pinion 8 is transmitted through the drive shaft 9 extending from the right of Fig. 3.

The hub 4 has a movable head or chuck 11 therein which has a set screw 12 affixing the spindle 13 in position. This spindle is in turn threaded at 14 into the hub so that turning of the spindle will cause either inward or outward movement of the head 11 as desired, depending upon the direction of rotation of the spindle 13.

Figure 4:
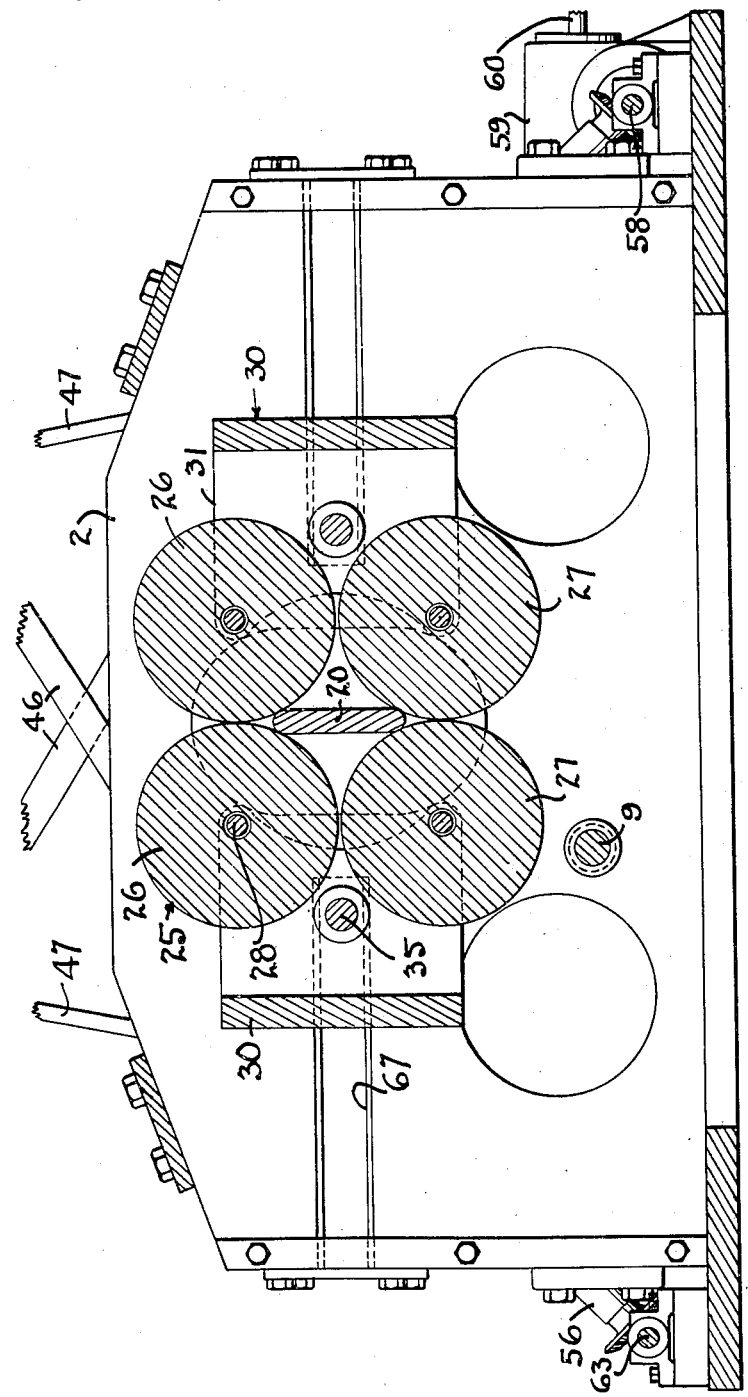
Fig. 4 is a sectional view showing the pressure rollers and the equalizing carriages arranged in starting position.

The inner end of each of the heads 11 has a transverse slot 17 therein to receive the flat core 20. This core is preferably made of wood or other suitable material as best seen in Fig. 4. The ends of the core will be slipped into the slots 17 as the spindles 13 are rotated to adjust the position of the chucks 11 relative to the hubs 4. Each of the heads 11 carries a flange 21 which will be so positioned that the two opposite flanges 21 will define the width of the bale which is to be formed on the core piece 20. A suitable fitting 23 may be provided in order to lubricate the rotative movement of the hub 4 in the frame or side piece 2.

As seen in Fig. 4 the core 20 is in the form of a flat piece which will form an elliptical bale 40 as seen in Fig. 5 when the strand or bat 24 of cotton or other material is wound thereon.

The bale will be started with the parts in the position of Fig. 4, wherein a set or pair 25 of pressure rollers is arranged on each side of the core. Each set of rollers is made up of the top roller 26 and a bottom roller 27. There are two sets of opposed rollers. Each roller is mounted for rotation upon a shaft 28 by means of roller bearings and the two shafts of each pair are mounted in turn upon a carriage 30. This carriage is best seen in section in Fig. 1 as being substantially U shaped, in that it has the sides 31 extending inwardly toward the center of the press and a rigid back portion 32 supporting the side pieces 31. The carriage itself is pivotally mounted upon the carriage shaft 35, which is in turn mounted in a slide bearing 37, one of which is provided in each corner of the press, so that there are four of these bearings in all, two of which support each of the opposite carriages.

It seems obvious that as the core 20 rotates it will cause a reciprocating movement of these pressure rollers to accommodate the difference in length between the major and the minor axes of this core piece 20, and, of course, the bale which is being formed thereon as seen in Fig. 5. Each pair of rollers will rock to and fro as the core and bale rotate, but it is intended that all four of the rollers will be in contant contact with the surface of the bale being formed, so as to apply pressure thereto, and to cause a predetermined density of the fibrous material which is being wound on to the bale. The carriage will rock so as to permit this tilting movement, as the rollers follow the periphery or contour of the bale being formed.

In order to apply a predetermined pressure to these rollers and to properly form the bale, it is desirable to urge the carriages 30 toward each other and to force the rollers against the bale with a predetermined and uniform pressure. This is not an easy problem, however, because of the fact that the bale starts with the size of the core as seen in Fig. 4 and gradually increases in size to take on the elliptical form shown in Fig. 5.

The bale 40 as seen in Fig. 5 may be formed to any desired size depending upon circumstances and conditions where it is to be shipped or used.

Figure 1:
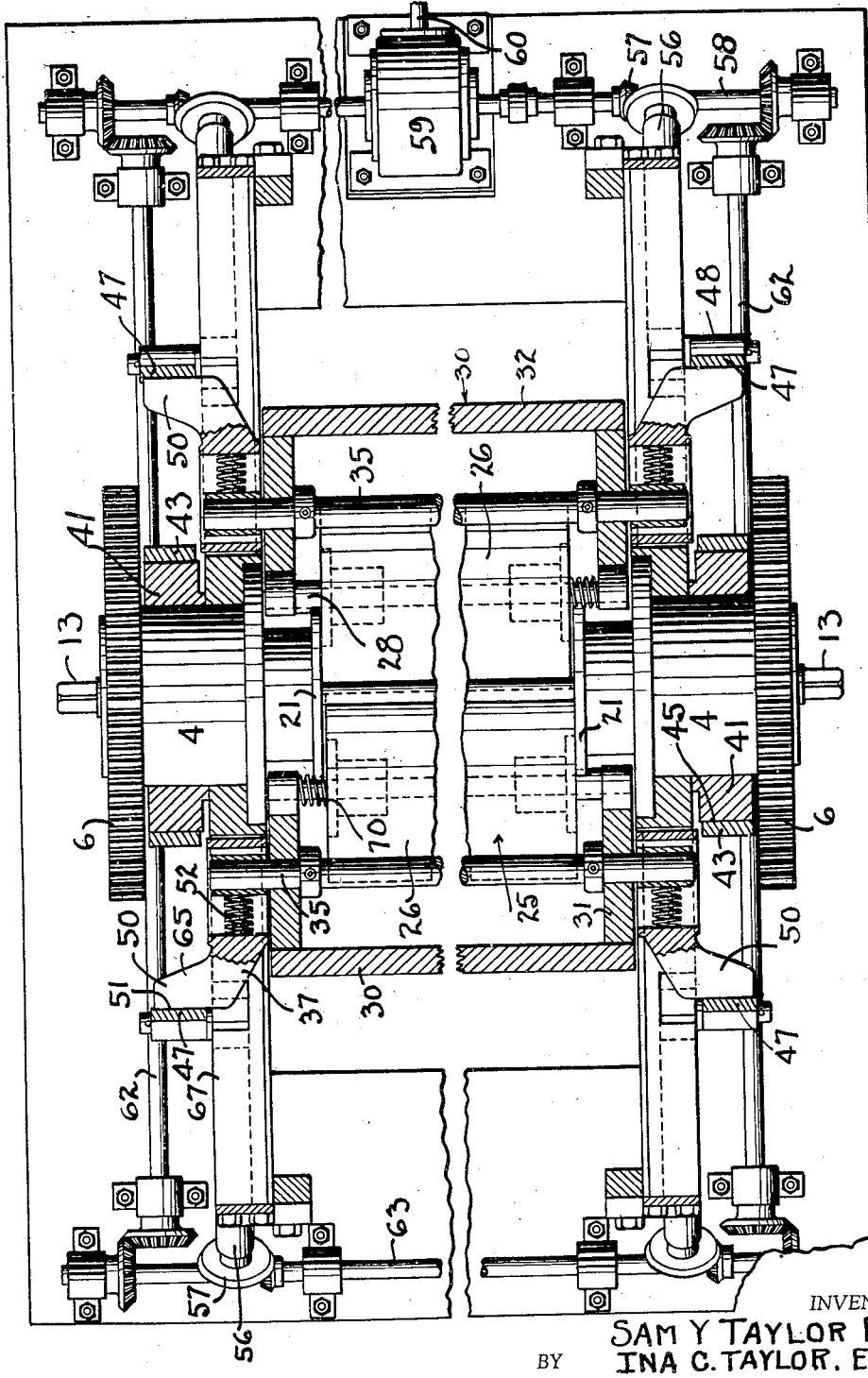
Figure 2:
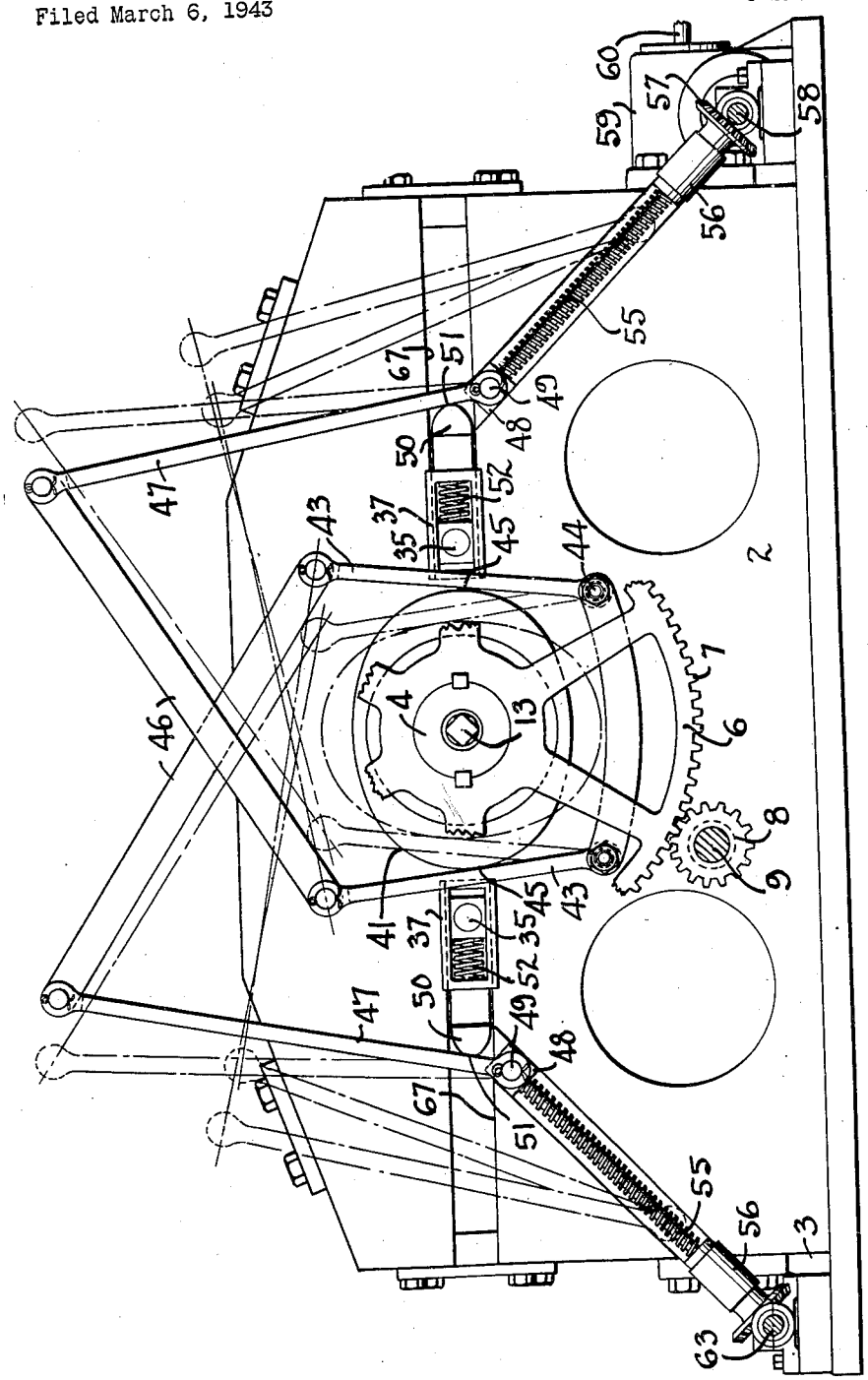
Fig. 2 is a partial side elevation illustrating the pressure applying mechanism and showing by dotted lines the various positions which the mechanism may assume.

To control the operation of the carriages 30 and to apply the positive pressure described, the mechanism of Fig. 2 has been provided. This mechanism includes a cam plate or body 41 of substantially elliptical configuration which is mounted on each of the hubs 4 as best seen in Fig. 3 which illustrates the shorter axial dimension of the cam in vertical section, while Fig. 1 illustrates the longer axial dimension of the cam in horizontal section. This cam is shown in full lines in Fig. 2 in one position and in dotted lines in another position. It seems obvious that as the hub is turned the cam will execute a corresponding rotation.

Fig. 2 shows a pair of arms 43, one of which is arranged on each side of the cam. These arms are pivoted at 44 to the frame and are upstanding so as to contact the cam at the points 45. A link 46 is pivoted to the upper end of each of these arms, and each link is in turn pivoted to a lever 47 which is pivoted on a bushing 48 by means of the pin 49.

When this mechanism is assembled as seen in Fig. 2 a rocking movement is imparted by the cam 41 through arms 43 and links 46 to the bearings 37 when the press is placed in operation by application of power to the drive gear 6. The various dotted line positions show a cycle of operation of the mechanism just described. The purpose of this mechanism is of course to apply a desired pressure to the sliding bearings or shaft support construction 37, which carry the carriage shafts 35 whereby the thus controlled pressure is applied peripherally to the bale 40 forming on the core 20.

It may be noted that the major axis of the cam body 41 is disposed at right angles to the width of the core 20. Hence the forming bale 40 separates the carriages 30 by exerting pressure on the rollers 25 and these carriages in turn move the bearings 37 outwardly of the frame. This outward movement of the bearings causes the plungers 50 to contact the levers 47 at the points 51. This application of pressure to levers 47 in turn causes the levers 43 to follow the cam surface of the cam 41 as it moves from the full line position to the dotted line position shown in Fig. 2. In order to accommodate inequalities in the operation, a cushion spring 52 has been provided in each carriage by which pressure is applied thereto from the lever 47.

In order to accommodate the increasing size of the bale 40, each bushing 48 is mounted on a threaded spindle 55, which is supported in a bearing 56 and caused to rotate by means of the beveled gearing 57. This gearing in turn is driven by a shaft 58 connected to a speed reducing mechanism 59 driven from a shaft 60 from any desired source of power which may be the same source which drives the pinions 8.

It seems obvious that, as seen in Fig. 1, there will be four of these spindles 55 arranged to actuate the opposite sides of the opposed carriages 30. In order to transmit the power from one end of the frame to the other, the line shafts 62 are driven from the end shaft 58 so as to carry the power to the opposite end shaft 63. As seen in Fig. 1, each slide head 37 is of peculiar configuration, in that the plunger 50 has an offset portion 65 to engage with the lever 47, so as to effect sliding movement in the trackway 67.

Figures 1 and 3 show a spring member 70 disposed inside one end of each of the carriages on opposite sides thereof. These springs press against the pressure rollers 26 so as to force the rollers in one carriage against the guide plate 21 on one side, while the rollers on the opposite carriage press against the guide plate 21 on the opposite side. In this manner the rollers will fit closely against the guide plates and the entire bale, including the extreme ends thereof, will be subjected to compression.

In operation the core will be inserted as seen in Fig. 4 and the bat 24 of material started thereon. As the core is caused to rotate, the bat of material will be wound around the core so that the bale increases in size as seen in Fig. 5. As the bale increases it seems clear that the spindles 55 will gradually retract the bushings 48 and cause the pressure arms 47 to retract accordingly. This, in turn, permits the bale to push the carriages 30 and the pressure rollers outwardly at a gradual, uniform, and constant speed, as the size of the bale increases. It seems clear that the speed reducing mechanism 59 can be adjusted to accommodate the thickness of the particular bat 24 which is being fed on to the bale so as to apply the pressure which will form the desired density of bale.

Broadly the invention contemplates a bale press which will form a round type of bale of suitable size and density and which will be made up of a continuous bat of material.

What is claimed is:

1. A baling press for forming a bale from a continuous bat of material upon a core comprising, means to receive and rotate the core, a plurality of pairs of spaced pressure rollers to roll on the surface of the bale being formed to continuously compress the bat of material being wound, a carriage for each pair of rollers, a cam and leverage means to normally urge each carriage and its rollers against the bale with a predetermined pressure, and means for controlling the position of said carriages and operable to allow said carriages to retract as the bale increases in size.

2. A baling press for forming a bale from a continuous bat of material upon a core comprising, means to receive and rotate the core, a plurality of pairs of spaced pressure rollers to roll on the surface of the bale being formed to continuously compress the bat of material being wound, a carriage for each pair of rollers, a cam and leverage means to normally urge each carriage and its rollers against the bale with a predetermined pressure, and means for controlling the position of said carriages and operable to allow said carriages to retract as the bale increases in size, said last means including a series of gearing and spindles driven at a predetermined speed.

3. A baling press for forming a bale from a continuous bat of material upon a core comprising, means to receive and rotate the core, a plurality of pairs of spaced pressure rollers to roll on the surface of the bale being formed to continuously compress the bat of material being wound, a carriage for each pair of rollers, a cam and leverage means to normally urge each carriage and its rollers against the bale with a predetermined pressure, and means for controlling the position of said carriages and operable to allow said carriages to retract as the bale increases in size, said first means being releasable.

4. A baling press for forming a bale from a continuous bat of material upon a core comprising, means to receive and rotate the core, a plurality of pairs of spaced pressure rollers to roll on the surface of the bale being formed to continuously compress the bat of material being wound, a carriage for each pair of rollers, a cam and leverage means to normally urge each carriage and its rollers against the bale with a predetermined pressure, and means for controlling the position of said carriages and operable to allow said carriages to retract as the bale increases in size, said carriages being pivotally mounted so as to allow equalizing of the pressure of the rollers carried thereby.

5. A baling press for forming a bale from a continuous bat of material upon a core comprising, means to receive and rotate the core, a plurality of pairs of spaced pressure rollers to roll on the surface of the bale being formed to continuously compress the bat of material being wound, a carriage for each pair of rollers, a cam and leverage means to normally urge each carriage and its rollers against the bale with a predetermined pressure, and means for controlling the position of said carriages and operable to allow said carriages to retract as the bale increases in size, said cam and leverage means including a cam on said first means and a series of levers connected to said last means.

INA C. TAYLOR,
*Executrix of the Estate of Sam Y. Taylor, Deceased.*

REFERENCES CITED

The following references are of record in the file of this patent:

UNITED STATES PATENTS

| Number | Name | Date |
|---|---|---|
| 125,031 | Dodge | Mar. 26, 1872 |
| 175,404 | Adamson | Mar. 28, 1876 |
| 900,205 | Reagan | Oct. 6, 1908 |
| 983,086 | Reagan | Jan. 31, 1911 |
| 1,733,434 | Taft | Oct. 29, 1929 |
| 1,825,218 | VanHook | Sept. 29, 1931 |